United States Patent [19]

Minnich

[11] 4,268,979

[45] May 26, 1981

[54] METHOD AND APPARATUS TO EXTEND THE BANDWIDTH OF BUFFETING IN FLIGHT SIMULATORS

[75] Inventor: George E. Minnich, Vestal, N.Y.

[73] Assignee: The Singer Company, Binghamton, N.Y.

[21] Appl. No.: 934,352

[22] Filed: Aug. 17, 1978

[51] Int. Cl.² .................................................. G09B 9/08
[52] U.S. Cl. ...................................... 434/46; 307/520; 328/167; 330/126
[58] Field of Search .................... 35/12 R, 12 D, 12 E, 35/12 F, 12 N, 12 K, 12 P, 12 W, 125; 307/229, 295; 328/167; 330/107, 109, 126, 294

[56] References Cited

U.S. PATENT DOCUMENTS

| | | | |
|---|---|---|---|
| 3,307,408 | 3/1967 | Thomas et al. | 328/167 X |
| 3,376,658 | 4/1968 | Thurner | 35/12 K |
| 3,421,141 | 1/1969 | Meygrhoff | 328/167 |
| 3,659,212 | 4/1972 | Saliga | 328/167 |
| 3,787,774 | 1/1974 | Tietze et al. | 328/167 |
| 3,912,916 | 10/1975 | Grun et al. | 328/167 |
| 3,919,648 | 11/1975 | Uetrecht | 330/107 |
| 3,978,420 | 8/1976 | Lane | 330/107 |
| 3,987,370 | 10/1976 | Schutz | 330/107 |
| 4,001,712 | 1/1977 | Chambers et al. | 330/107 |
| 4,030,208 | 6/1977 | Carver et al. | 35/12F |

OTHER PUBLICATIONS

Sound and Vibration; "Active Vibration Isolation for Aircraft Seating;" Mar., 1972; pp. 18–23.

Primary Examiner—Vance Y. Hum
Attorney, Agent, or Firm—James C. Kesterson; Stephen C. Kaufman; Jeff Rothenberg

[57] ABSTRACT

Method and apparatus for driving the motion system of a flight trainer to simulate aircraft buffeting which method and apparatus avoids the resonant frequency of the motion systems hydraulic actuators by using a "Linear Tracking Band-Stop Filter". Band-stop filter circuitry is combined with linear tracking band pass filter circuitry to provide the linear tracking band-stop filter. This circuit receives command signals intended for the servoamplifier used to drive a hydraulic actuator. The band-stop filter eliminates or substantially attenuates those frequencies contained in the command signal which would cause resonance of the hydraulic actuator. It has been discovered that the resonance frequency of the hydraulic actuator varies as a function of the extension of the actuator, and therefore in this invention the center frequency of the band-stop filter tracks the resonant frequency of the actuator such that a much smaller band of frequencies is eliminated.

7 Claims, 4 Drawing Figures

METHOD AND APPARATUS TO EXTEND THE BANDWIDTH OF BUFFETING IN FLIGHT SIMULATORS

This invention relates to flight simulation and more particularly to circuitry which allows the use of high-input signal levels across the frequency band applied to the vibration system used for simulating aircraft buffeting in a grounded flight trainer.

Over less than five decades, the art of flight simulation has advanced from the early bellows-driven LINK trainers to today's highly sophisticated, computer controlled, flight mission simulators. With ever increasing versatility and fidelity, today's simulators duplicate a broad spectrum of flight conditions, and aircraft performance in both normal and malfunction modes. Employing advanced motion systems, digital computers, visual displays and the like, present day simulators are able to generate and integrate a multiplicity of realistic flight cues to provide effective training for flight crew members.

One flight cue often simulated is aircraft buffeting. During wind turbulence or relative high angles of attack, most aircraft will vibrate or buffet due to air flow over the wings. These vibrations are transmitted through the aircraft's structure to the pilot who uses the intensity (frequency and amplitude) of the vibration as a cue to the aircraft's attitude with respect to its maneuvering limits. This aircraft buffeting provides the pilot with a warning of impending stall or loss of control.

Simulated aircraft buffeting is often achieved by driving the motion system or base of a flight trainer to vibrate the total cockpit. However, this technique often suffers from the disadvantage that the motion system does not have the frequency response capable to do a good job of simulating the buffeting encountered in an actual aircraft. Generally, only one frequency is available with such a motion system; namely, one-half the update rate of the motion drive signal. However, the buffet frequency for particular aircraft is not fixed, and to the contrary, normally varies with angle of attack and flight conditions.

A number of prior art simulators have resorted to special motion bases to vibrate a simulated aircraft fuselage. U.S. Pat. Nos. 2,787,842 and 3,376,658 illustrate this approach. Although these patent systems are capable of simulating rough air and helicopter blade stall, respectively, they apparently do so at the expense of normal flight simulation.

Another approach to buffeting is to mount the pilot seat on a moveable section of the cockpit floor which can be vibrated relative to the remainder of the cockpit. This technique was used in the early 1960's on an Edward's Air Force Base Flight Trainer, and does avoid any difficulties which might arise from vibrating the complete cockpit with its sensitive electronics. However, there are many aircraft cockpit arrangements where it would be extremely difficult to attach the seat to the cockpit floor. On, for example, many military aircraft with pilot ejection systems, the seat is mounted on ejection rails rather than on the floor. Further to provide the seat vibration with such a movable floor section and still allow the pilot to adjust the seat in the normal manner, would require an ungainly and unduly complex system. Similar seat adjustment problems are presented by a vibration mechanism affixed to the cockpit floor beneath the seat pan, such as that shown in British Pat. No. 1,004,005. Likewise, limited space between the seat and cockpit floor makes a scheme involving an actuator mounted to the underside of the seat pan (See British Pat. No. 979,495) impractical in many situations.

Another approach for providing buffeting is that disclosed in U.S. Pat. No. 4,030,208 by Fred F. Carver and Carl E. Hoyt which issued June 21, 1977. This application entitled, "Seat Vibration for Simulating Aircraft Buffeting" provides for a vibration control signal having its frequency and amplitude controlled by a computer as a function of the simulated aircraft angle of attack and maneuvering load factor. This vibration control signal is applied to a hydraulic actuator which acts through a bell crank and linkage to vibrate the seat. Still another approach to simulating aircraft buffeting is illustrated in U.S. Pat. No. 3,270,440. In the flight simulator shown therein, buffeting is simulated by creating a pulsating pressure in the air cells of the pilot's seat. Since both the frequency and amplitude of seat pulsation is fixed, this prior art system does not effectively simulate aircraft buffeting.

To overcome the shortcomings of these and other available methods, it is an object of this invention to provide a method of simulating the buffeting of an aircraft which does not exclude a large band of frequencies around the resonant frequency of the hydraulic actuator of a motion system.

It is another object of this invention to provide apparatus for driving a motion system to provide simulated buffeting which does not exclude a large body of frequencies around the resonant frequency of the hydraulic actuator of a motion system.

It is still another object of this invention to provide circuitry which eliminates or substantially attenuates a narrow band of frequencies around the resonant frequencies of the hydraulic actuator of a motion system.

To accomplish the above-mentioned objects as well as other objects which will become evident from the following drawings and detailed description, the present invention provides linear tracking band-stop filter circuitry which has a center frequency which varies with changes in a monitor signal. The monitor signal is typically representative of extension of a hydraulic actuator. The band-stop filter circuit comprises a band-pass filter which receives a command signal which typically contains a full spectrum of frequencies; including, for example, the resonant frequencies of the hydraulic actuator which provides the monitor signal. The band-pass filter then processes the command signal and provides a modified command signal containing only frequencies of a specific, but variable, frequency band; such as, for example, frequencies around the resonant frequency of the hydraulic actuator. The band-pass filter also includes feedback circuitry which varies the center frequency of the frequency band. This feedback circuitry includes multiplying means which has a first and second control port, and an output port for providing a resultant output which has a value proportional to the multiplied values of the two signals received at the two control ports. One of the control ports is connected to the output of the band-pass filter such that it receives the modified command signal and the other control port receives a control signal from circuitry which receives the monitor signal and then converts it to the control signal which has a form suitable for use by the band-pass filter. The modified command signal is then inverted by circuitry to provide a drive signal. The drive signal may be used to drive other apparatus such as for example, a hydraulic actuator. The drive signal (i.e. the inverted modified command signal) will include frequency components which were eliminated or substantially attenuated by the band-pass filter (i.e. did not pass through), but will itself eliminate or substantially attenuate those frequencies which were substantially unattenuated by the band-pass filter (i.e. frequency component that did pass through).

This linear tracking band-stop filter is particularly suitable for eliminating or substantially attenuating those frequency components of the drive signal of a hydraulic actuator control system which causes the hydraulic actuator to resonate. To operate in such a manner, the control system includes a control means, such as for example, a computer for providing the command signal to cause the required actuator movement. This signal is provided to the linear tracking band-stop filter which eliminates or substantially attenuates a narrow band of frequencies around the frequency component of the signal which would cause the actuator to resonate. The center frequency of this narrow band of frequencies varies according to a monitor signal which is provided by a position sensing means and is representative of the amount of extension of the actuator. The monitor signal and the drive signal are both received by a servo means which causes the hydraulic actuator to move to the desired position. The servo means compares the monitor signal with the drive signal to move the actuator until it is at the position commanded by the drive signal.

Figure 1:
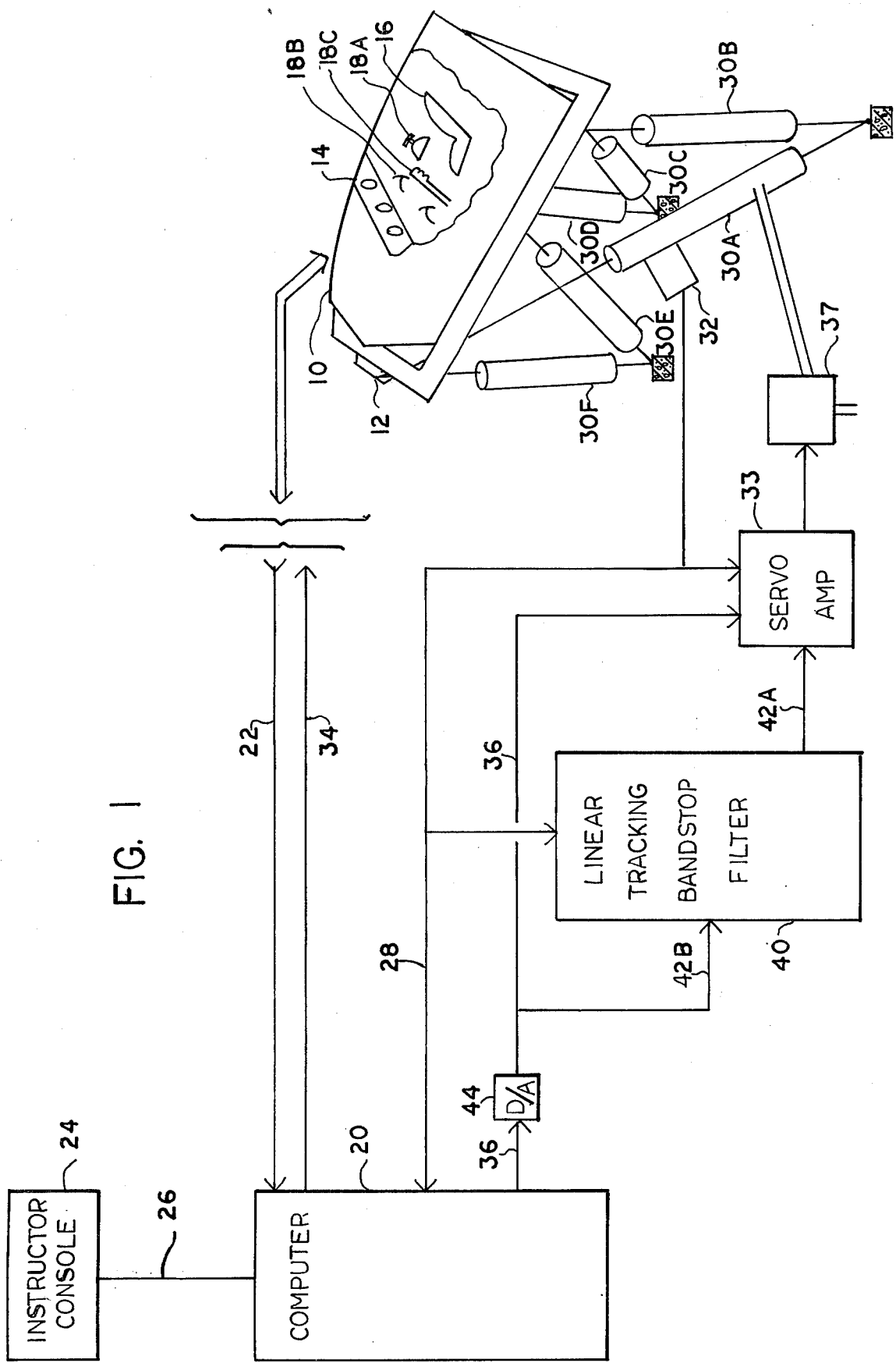
FIG. 1 is a partial pictorial and partial block diagram of a modern six degree of freedom motion system simulator complex using the apparatus and method of this invention with a system to provide realistic simulated buffeting.
Figure 2:
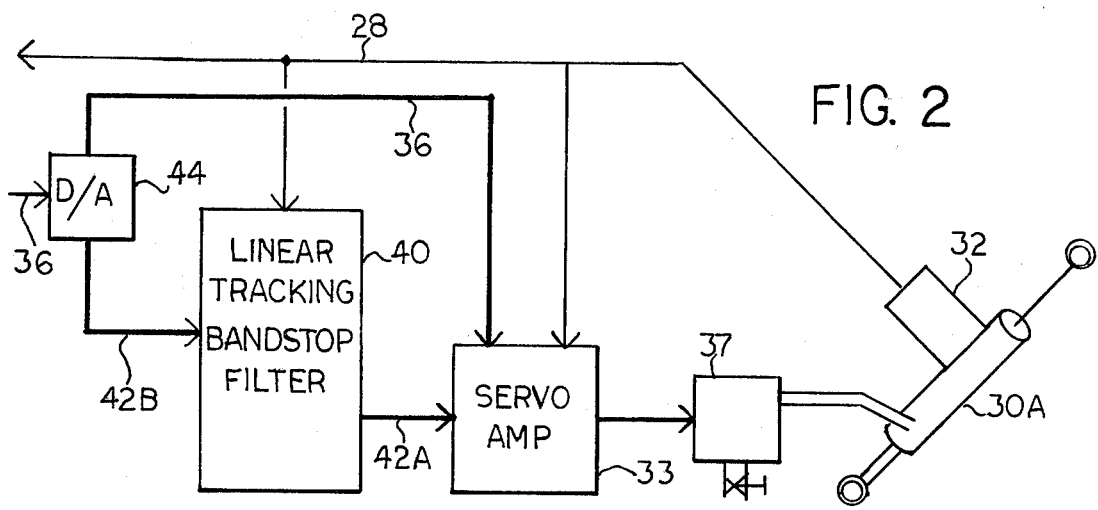
FIG. 2 is a second illustration of how the present invention operates with the hydraulic actuator of a motion system to provide realistic buffeting.

Referring now to FIG. 1 there is shown a modern aircraft simulator complex which incorporates the buffeting control circuitry of the present invention. Simulator cockpit 10 is mounted on support structure 12. The interior of simulator cockpit 10 is typically manufactured to have the exact appearance of the aircraft being simulated and includes instruments 14, seat 16 and controls 18 (such as throttle 18A, pedals 18B for controlling the rudder, and control stick 18C for controlling the aelirons and elevators). Electrical signals representative of the movement of controls 18 by a pilot trainee (not shown) are provided to computer 20 as is represented by line 22. Computer 20 also receives input from the instructor station 24 represented by line 26. The inputs from the instructor station typically provide aircraft malfunction, and flight conditions information such as wind, turbulence, etc. to computer 20. In addition to the above mentioned inputs, computer 20 also receives feedback signals on line 28 representative of the movement of cockpit 10 as flight is simulated. Six degrees of movement of cockpit is achieved as a result of movement of the six actuators 30 (labeled individually as 30A, 30B, 30C, 30D, 30E, and 30F) which are mounted to support structure 12. As each actuator operates (i.e. extends and/or retracts) an electrical monitor signal from a position sensing device attached to each of the actuators is generated which represents the amount of extension of the actuator. As shown in FIGS. 1 and 2 the position sensing device for actuator 30A is designated as position sensing device 32. It is this signal which is, for example, illustrated as being carried by line 28 from position sensing device 32 attached to hydraulic actuator 30A, which is provided to the computer 20 by means of line 28. Upon receiving the various input signals from actuators 30, instrument station 24, and cockpit 10, they are processed by computer 20 in accordance with a flight profile programmed in the computer memory which profile represents the flight characteristics of the aircraft being simulated. The computer then provides signals to instruments 14 in cockpit 10 by means of line 34, and to servo-amplifier 33 and D/A converter 44 by means of line 36. Servo-amplifier 33 then compares the command signal of line 36 with the position of the actuator as is represented by the feedback or monitor signal on line 28 from position sensing device 31. From this comparison, servo-amplifier 33 generates an error signal that controls a hydraulic valve 37 which in turn controls the operation of the hydraulic actuator 30A to provide to the pilot trainee motion cues representative of the simulated aircraft flight. For example, in an operational aircraft, buffeting due to a high angle of attack flight is normally detected by the pilot when the cockpit starts to vibrate or shake. As the angle of attack is increased, the magnitude and frequency of vibrations will also usually change. Consider by way of example the vibration response of the F-4. This aircraft will start to buffet with a low amplitude and high frequency at eight to twelve degrees angle of attack. As angle of attack increases, the vibration amplitude increases and frequency decreases. These motions are transmitted through the aircraft structure to the pilot who uses them as an aide to get the maximum possible maneuvering performance out of the aircraft. Most aircraft give the pilot a buffet warning with impending stall or loss of control but the specific vibration characteristics vary from one type of aircraft to another. Also, since wind turbulence is one of the factors affecting aircraft flight, and since buffeting results from wind turbulence as well as the angle of attack of the aircraft and the flight maneuver performed by the pilot, it will be appreciated that the flight instructor can initiate the buffeting from instructor console 24 by providing the proper wind and turbulence information to computer 20. This control is shown as being provided to computer 20 by means of line 26. It will further be appreciated that according to this invention buffeting is achieved by driving each of the hydraulic actuators 30 at an appropriate frequency. Therefore, as is shown in FIGS. 1 and 2, the feedback or monitor signal from position sensing device 31 on line 28 representative of the position of hydraulic actuator 30A is also applied to buffeting circuit 40 which provides a drive signal, in addition to the command signal used to create the normal motion cues, to servo-amplifier 33 on line 42A which drive signal contains frequency components representative of buffeting in response to the command signal from computer 20 on line 42B.

Computer 20 determines the required vibration frequency and amplitude or buffeting as a function of wind, turbulence and the simulated aircraft angle of attack and maneuvering load factor. Computer 20 may also represent any digital or analog computer capable of generating the required vibrating control signals in real time. As is illustrated in FIG. 1, computer 20 controls the total aircraft simulator and may be used to operate the vibration or buffeting system. As an example, a Systems Engineering Laboratories system 86 digital computer has been used successfully as a computational device, and for certain applications could drive the hydraulic actuator directly. However, since the maximum frequency that can be transmitted between the computer and an analog device is quite low, the signals used to drive the buffeting system are preferably transmitted to a digital to analog convertor 44. This D/A convertor converts digital signals from computer 20 into analog signals representing the desired frequency and amplitude of the buffeting.

As will be appreciated by those skilled in the art, it is of the utmost importance that the resonance frequency of the hydraulic actuators 30 in the simulator complex be avoided. Otherwise severe structural damage to the actuators or even catastrophic failure of the motion system could occur. Therefore, in the past it has been a practice to use a fixed band-stop filter ahead of the servo-amplifier 33 to substantially attentuate or eliminate those frequencies at which resonance of the actuators might occur. Typically such a band-stop filter would substantially attenuate a substantial band of frequencies around a fixed center frequency. An example of such a filter used in the past was to provide a filter which covered a 1 $H_z$ band centered around a center frequency selected between 6 $H_z$ and 30 $H_z$. Additional information concerning band stops or band reject filters may be found in pages 286 and 287 of "Operation Amplifier, Design and Application" by Tobey, Graeme, Huelsman and published by BurrBrown in 1971. However, since actual aircraft buffeting may cover a complete spectrum of frequencies including those affected by the band-stop filter, it will be appreciated that the substantial elimination of a band of frequencies around the resonance frequency of an actuator might well affect the realism of the simulator buffeting.

The applicant has discovered that the resonance frequency of the hydraulic actuator used in a modern flight simulator with a motion system varies substantially linearly with respect to the amount of extension of the actuators. Therefore, according to this invention a "Linear Tracking Band-Stop Filter" is provided in which the center frequency of the band-stop filter is substantially a function of the extension of the actuator. Thus, the frequency band of the band-stop filter can be substantially reduced since the center frequency will track the resonants frequency of the actuator. Furthermore, many modern simulators have a six degree of freedom motion system in which each of the six actuators (see FIG. 1) operates independently of the others (that is each may be extended a different amount). Therefore, it is not unlikely that if a linear tracking band-stop filter is provided for each actuator, the center frequency of the six actuators will be separated enough that no frequency in the buffeting sprectrum will be entirely eliminated by all six actuators. Furthermore, because of the tracking of the band-stop filter on each actuator the time that a frequency band is eliminated by any particular actuator at any specific point in time is substantially reduced.

Information relating to band pass filters may be found on pages 105 and 106 of "Applications of Operation Amplifiers—Third Generation Techniques" by Jerald G. Graeme, published in the Burr-Brown Electronic Series, 1973.

Figure 3:
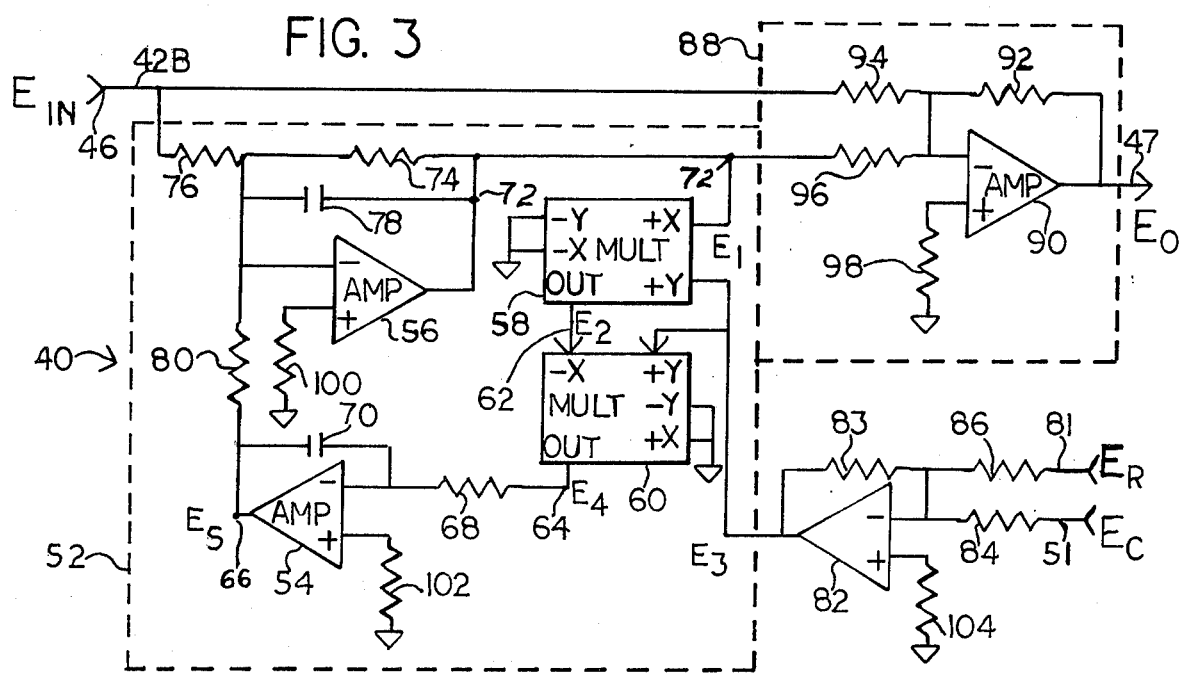
FIG. 3 is a circuit diagram of a "Linear Tracking Band-Stop Filter" used in the method and apparatus of this invention to achieve realistic and simulated aircraft buffeting.

Referring now to FIG. 3 there is shown a "Linear Tracking Band-Stop Filter" of this invention which allows for a substantial increase in the buffeting frequency applied to the motion system of a simulator.

Figure 4:
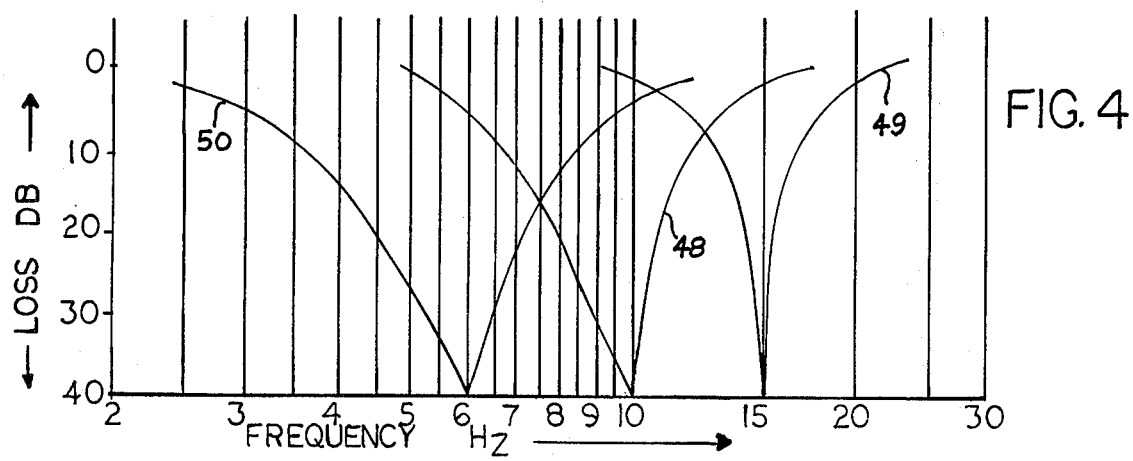
FIG. 4 is a family of curves showing how the "Linear Tracking Band-Stop Filter" of FIG. 3 eliminates or substantially reduces the resonant frequencies of a drive signal used to control a hydraulic actuator.

The command signal which contains the appropriate frequency and amplitude for driving hydraulic actuator 30 is provided to "Linear Tracking Band-Stop Filter" 40 at input point 46 (also labeled $E_{in}$) on line 42B. The output or drive signal from the linear tracking band-stop filter 40 at point 47 (also labeled Eo) is similar to the command signal received at input point 46 except that certain frequency components of the command signal received at point 46 are substantially attenuated in the drive signal at point 47 in response to a monitor signal received at point 51 (also labeled $E_c$). Curve 48 of FIG. 4 illustrates the attenuation, plotted against frequency, of the drive signal line 42 with respect to the command signal when actuator 30A is extended halfway. Dashed curves 49 and 50 illustrate the attenuation of the drive signal when the actuator is fully retracted and fully extended respectively. As was discussed heretofore, it will be appreciated that the drive signal at output point 47 of FIG. 3 is provided to servo-amplifier 33, shown in FIGS. 1 and 2. It is this drive signal which determines the positioning of the actuator which in turn results in the buffeting. The monitor signal on line 28 from position sensing means 32 which is received at point 51 is representative of the position of the actuator as it responds to the output signal $E_o$ provided at point 47.

As will be appreciated by those skilled in the art, that portion of the circuitry of FIG. 3 which is labeled 52 operates as a band-pass filter composed of two integrating amplifier circuits 54 and 56 in a feedback loop which use two multiplier circuits 58 and 60 to control the center frequency of the band-pass filter 52.

More specifically, the band-pass filter 52 operates according to the following relationships. The voltage output of multiplier 58 at point 62 (also labeled $E_2$) is computed as;

$$E_2 = E_1 E_3 / 10 \qquad (1)$$

and likewise the voltage output of multiplier 60 at point 64 (also labeled $E_4$) is computed as:

$$E_4 = E_2 E_3 / 10 \qquad (2)$$

Therefore combining equations (1) and (2) to obtain the output voltage of multiplier circuit 60 in terms of $E_3$ and $E_1$, yields:

$$E_4 = E_1 E_3^2 / 100 \qquad (3)$$

The output of integrating amplifier 54 at point 66 (also labeled $E_5$) is computed as:
$$\text{Ti } E_5 = -E_4 / S\ R_{68} C_{70} \qquad (4)$$

wherein $R_{68}$ is the resistance value of resistor 68, $C_{70}$ is the capacitance of capacitor 70 and S equals the complex variable representative of $\sigma + j\omega$ also called the complex frequency. Similarly, the output of integrator 56 at point 72 (also labeled $E_1$) is computed as:

$$E_1 = \frac{R_{74}}{R_{76}} \frac{E_{in}}{1 + SR_{74}C_{78}} - \frac{R_{74}}{R_{80}} \frac{E_5}{1 + SR_{74}C_{78}} \quad (5)$$

wherein $R_{74}$ is the resistance of resistor 74, $R_{76}$ is the resistance of resistor 76, $C_{78}$ is the capacitance of capacitor 78 and $R_{80}$ is the resistance of resistor 80. Therefore combining and rearranging terms we obtain the linear band-pass function as:

$$\frac{E_1}{E_{in}} = \frac{\frac{-S}{R_{76}C_{78}}}{S^2 + \frac{S}{R_{74}C_{78}} + \frac{E_3^2}{100\,R_{80}R_{68}C_{78}C_{70}}} \quad (6)$$

However, as shown, and according to the invention, the linear tracking band-pass circuitry 52 is connected to additional circuit 88 which changes the band-pass function into a band-reject function such that the entire circuit 40 operates as a "Linear Tracking Band-Stop" (or band-reject) circuit. The output voltage $E_o$ from amplifier 90 of circuit 40 is computed as:

$$E_o = -\left(\frac{R_{92}}{R_{94}}\right)(E_{in}) - \left(\frac{R_{92}}{R_{96}}\right)(E_1) \quad (7)$$

wherein $R_{92}$, $R_{94}$ and $R_{96}$ represent the resistances of resistors 92, 94 and 96 respectively.

Therefore combining equations (6) and (7) and reorganizing terms the linear band-stop function becomes;

$$\frac{E_o}{E_{in}} = -\frac{R_{92}}{R_{94}}\left[\frac{S^2 + \frac{E_3^2}{100\,R_{80}R_{68}C_{78}C_{70}}}{S^2 + \frac{S}{R_{74}C_{78}} + \frac{E_3^2}{100\,R_{80}R_{68}C_{78}C_{70}}}\right] \quad (9)$$

which is similar to the standard transform function for;

$$\frac{e_o}{e_{in}} = \frac{S^2 + \omega_0^2}{S^2 + \Delta\omega S + \omega_0^2} \quad (10)$$

Therefore, comparing the "Linear Tracking Band-Stop Function" of circuit 40 expressed by equation (9) above with the standard transfer function shown in equation (10) it can be seen that the term $\omega_0$ in equation (10) is expressed as:

$$\omega_0 = \frac{E_3}{10\sqrt{R_{80}R_{68}C_{78}C_{70}}} \quad (11)$$

and that $\Delta\omega$ of equation (10) is expressed as:

$$\Delta\omega = 1/R_{74}C_{78} \quad (12)$$

From the comparison, it is seen that once the various resistor values and capacitance values are selected, the center frequency of the "Linear Tracking Band-Stop Circuit" 40, represented by $\omega_0$ is proportional to the control voltage $E_3$. Similarly the band width $\Delta\omega$ of circuit 40 is determined by the selection of resistor $R_{74}$ and capacitance $C_{78}$.

It should be understood that by using the two multipliers 58 and 60 instead of a single multiplier, equation (9) contains a squared $E_3$ term (i.e. $E_3^2$) which corresponds to the $\omega_0^2$ of equation (10). Thus by taking the square root of the $\omega_0^2$ term and the $E_3^2$ term as shown in equation (11) it is seen that the center frequency of the band-stop filter varies linearly with the input control voltage $E_3$. It should also be appreciated, of course, that the methods and apparatus of this invention are certainly appropriate even with the use of a single multipler. In such a case, however, the center frequency would vary according to the square root of the control voltage $E_3$ rather than linearly.

As was stated above, the voltage $E_3$ controls the center frequency of the band-pass filter 52 according to the actual hydraulic actuator extension position and is representative of the voltage $E_c$ of the monitor signal received at point 51. Since in a typical simulator system, voltage $E_c$ will vary from a given negative voltage through 0 to a given positive voltage, and since the the control voltage $E_3$ must, in general, vary within a different voltage range for the multipliers 58 and 60 to cause the center frequency of filter 52 to correspond to the resonant frequency of the hydraulic actuator, reference voltage $E_R$ is applied at point 81, to offset voltage $E_C$ a sufficient amount so that, in conjunction with the amplifying action of amplifier 82, the voltage range of $E_C$ is "translated" to the proper voltage range for $E_3$ to effect proper frequency tracking. Specifically, control voltage $E_3$ from amplifier 82 may be computed as:

$$E_3 = -E_c R_{83}/R_{84} + E_R R_{83}/R_{86} \quad (13)$$

wherein $R_{83}$, $R_{84}$ and $R_{86}$ represents the resistances of resistors 83, 84, and 86 respectively.

Thus, according to this invention the center frequency of the band-stop filter 40 varies with the extension position and therefore allows the frequency of the buffeting to include frequencies much closer to the hydraulic and/or mechanical resonance frequencies of the actuator such that there is little loss of realism or buffeting simulation. This means of course that since the circuitry tracks the resonance of the actuator, a smaller band of frequencies is lost in the simulation as compared with the technique of using a fixed band-stop filter. The reason for this, of course, is that the fixed band-stop filter must use a considerably wider band width to assure that the resonance frequencies are eliminated no matter what the extension of the actuator. In addition, by altering the value or $R_{96}$ the circuit can be adjusted to pass a small yet tolerable amount of the resonant frequency of the actuator. Allowing this smaller resonant frequency to reach the actuator provides even more buffeting simulation realism. Finally, as was mentioned heretofore, as each actuator extends and retracts independently of the other actuators and upon command of the computer, it will be appreciated that the resonant frequencies of each actuator might be completely different at any one moment of time. Therefore, by using the linear tracking band-stop filter of this invention it is also likely that all frequencies in the buffeting range may be experienced by the pilot trainee even though a particular actuator will have its own resonant frequency substantially attenuated by the tracking band-stop filter.

A specific example of the circuit shown in FIG. 3 which provides a desired 3 $H_z$ band-width linear tracking band-stop filtering may be achieved by using AD532 multipliers which are available from Analog Devices, Inc. Route 1, Industrial Park, P.O. Box 280, Norwood, Massachusetts 02062; HA-2605 amplifiers which are available from Harris Semiconductor, P.O. Box 883, Melbourne, Florida 32901; Capacitors $C_{70}$ and $C_{78}$, each having a capacitive value of 0.1 microfarads respectively; resistors having values in ohms of $R_{68}=453K$, $R_{74}=475K$, $R_{76}=475K$, $R_{80}=95.3K$, $R_{82}=28K$, $R_{84}=100K$, $R_{86}=57.66K$, $R_{92}=10K$, $R_{94}=10K$, $R_{96}=10K$, and grounding resistors $R_{98}$, $R_{100}$, $R_{102}$ and $R_{104}=3.3K$, 68.1K, 95.3K and 15.8K respectively.

While there have been described what are at present considered to be preferred embodiments of this invention, it will be appreciated by those skilled in the art that various changes or modifications may be made therein without departing from the invention, and it is, therefore, intended that this patent cover all such changes and modifications as fall within the true spirit and scope of the invention.

I claim:

1. Apparatus for modifying a command signal to produce a drive signal for controlling a drivable physical element having a frequency variable resonance characteristic comprising:
   (a) control input means for providing a control signal representative of a monitored variable physical condition of said drivable physical element; and
   (b) band-stop filter means having a center frequency corresponding to the frequency of said variable resonance characteristic, comprising
      (1) band-pass filter means for providing a band-pass function on said command signal to produce an output pass band signal, including inverting means such that said output pass band signal is opposite in polarity to said command signal, and multiplying feedback means, responsive to said control signal, for feeding back a portion of said output pass band signal multiplied by said control signal, whereby the center frequency of said band-pass circuit means varies in accordance with said control signal and
      (2) summing means for summing said output pass band signal with said command signal to produce said drive signal.

2. The apparatus of claim 1 wherein said drivable physical element is a hydraulic actuator having a resonant frequency which varies as a function of extension, and wherein said control input means comprises position-sensing means for monitoring the amount of extension of the hydraulic actuator and for providing said control signal as a function of the amount of extension, such that said center frequency of said band-stop filter substantially tracks said resonant frequency of said hydraulic actuator.

3. The apparatus of claim 1 wherein said drivable physical element comprises a hydraulic actuator and said control input means comprises
   (a) position sensing means for monitoring the amount of extension of said hydraulic actuator and for providing a monitor signal as a function of said amount of extension; and
   (b) converting means for modifying a predetermined characteristic of said monitor signal to convert said monitor signal into said control signal such that said control signal is in the proper signal range for said center frequency to vary in accordance with said resonance characteristic.

4. The apparatus of claim 1, 2 or 3 wherein said multiplying means comprises
   (a) a first multiplier having as inputs said output pass band signal and said control signal, respectively; and
   (b) a second multiplier having as inputs the output of said first multiplier and said control signal, respectively, such that said center frequency of said band-pass filter varies linearly with said control signal.

5. The apparatus of claim 3 wherein said converting means comprises:
   (a) reference means for providing a predetermined constant reference signal;
   (b) summing means for summing said reference signal and said monitor signal; and
   (c) amplifier means to amplify the sum of said reference signal and said monitor signal to produce said control signal.

6. A method for modifying a command signal to produce a drive signal for controlling a drivable physical element having a frequency variable response characteristic, comprising the steps of:
   (a) providing a control signal representative of a monitored variable physical condition of said drivable physical element;
   (b) providing a band-pass filter having a multiplying feedback means responsive to said control signal, and inverting means for inverting in polarity a signal applied thereto;
   (c) applying said command signal to said band-pass filter to produce a pass band output signal;
   (d) applying said control signal to said band-pass filter to vary the center frequency of said band-pass filter in accordance with said control signals; and
   (e) summing said pass band output signal with said command signal to produce said drive signal.

7. The method of claim 6 wherein said drivable physical element is a hydraulic actuator having a resonant frequency which varies as a function of extension, and wherein said step of providing a control signal comprises the steps of:
   (a) monitoring the amount of extension of the hydraulic actuator; and
   (b) providing said control signal as a function of the amount of extension, such that said center frequency of said band-pass filter substantially tracks said resonant frequency of said hydraulic actuator.

* * * * *